2,941,925
BOVINE RHINOTRACHEITIS VACCINE AND METHODS OF PRODUCTION

Charles J. York and Anton Josef Schwarz, Indianapolis, Ind., assignors to Allied Laboratories, Inc., Kansas City, Mo., a corporation of Delaware No Drawing. Filed Sept. 16, 1957, Ser. No. 683,930

8 Claims. (Cl. 167—78)

This invention relates to the propagation and modification of the virus of infectious bovine rhinotracheitis (I.B.R.) in tissue cultures of porcine kidney. More particularly, this invention relates to the development of a rhinotracheitis vaccine comprising a modified virus and useful for the prevention of the disease in cattle.

Infectious bovine rhinotracheitis is a virus disease that produces severe economic losses in the production of cattle. This virus disease and its detrimental effect in cattle is described by McKercher (McKercher, D.G., et al., Proc. 58th Annual Meeting, United States Livestock Sanitary Association, 1954, 260–269; McKercher, D.G., et al., Proc. 59th Annual Meeting, United States Livestock Sanitary Association, 1955, 151–167), and Miller (Miller, N.J., Journ. Amer. Vet. Med. Assn., 126:939, June 1955, 463–467).

Investigators in California (McKercher, op. cit.) and Colorado (Chow, T.L., et al., Proc. 59th Annual Meeting, United States Livestock Sanitary Association, 1955, 168–172), working with rhinotracheitis virus suspensions obtained from nasal washings or tissue suspensions from naturally infected cattle, failed to infect embryonated eggs, guinea pigs, rabbits, suckling mice, and other experimental animals. These failures occurred despite the fact that infected calf nasal washings or tissue suspensions contained the highest concentration of virus that can be obtained from infected cattle.

More recently, it has been found that this infectious bovine rhinotracheitis virus can be propagated in tissue culture roller tubes of bovine kidney cells (Madin et al., Science, 124:3225, October 19, 1956, 721–722; York, C.J., et al., Proc. Soc. for Exper. Biol. and Med., 1957, 94:740.) With the use of the bovine kidney tissue culture procedure, a method was discovered to develop a modified virus for immunizing cattle against infectious bovine rhinotracheitis (York, C. J. and Schwarz, A. J. F., Proc. 60th Annual Meeting, United States Livestock Sanitary Association, Chicago, 1956, 149). However, in the use of the procedure with bovine kidney tissue a number of disadvantages are present. For example, there is no satisfactory method of preventing the possible introduction into the tissue culture of other bovine viruses that might be present in the tissues prior to the time they are processed in tissue culture, such as virus diarrhea of cattle, mucosal disease of cattle, vesicular stomatitis, or other as yet unidentified agents. In view of the foregoing it is advantageous that we have found that infectious bovine rhinotracheitis virus can be propagated in porcine kidney tissue culture, thus providing a method of producing a vaccine that will not allow the introduction of the above mentioned bovine viruses.

We have also discovered that the porcine kidney tissue culture-propagated virus can be modified so that its disease-producing potential is lost when inoculated intranasally or intramuscularly into calves. An important commercial result of our discovery is that when an aqueous suspension of the virus material is inoculated intramuscularly into calves it immunizes them against virulent rhinotracheitis disease.

Our discovery that the rhinotracheitis virus can be propagated in porcine kidney tissue cultures could not have been predicated in advance since this virus normally infects the respiratory tissues, such as, turbinate, larynx and trachea of bovines. Even kidney tissues obtained from cattle infected with rhinotracheitis virus do not have associated therewith any I.B.R. viruses and, in view of the well known fact that viruses show specific tissue preferences, there was no reason to suspect that the virus could be propagated in a foreign tissue culture medium of porcine kidney. It was likewise totally unpredictable that a virulent rhinotracheitis virus could be propagated and serially passed through porcine kidney tissue cultures to result in a modification of the disease-producing ability of the virus without destroying its antigenic-producing properties in the bovine.

In carrying out our invention, porcine kidney cells are propagated in appropriate containers, using a tissue culture fluid medium suitable for the growth of the cells. The nutrient fluid which we prefer to employ consists of eight parts of Earles BSS—balanced salt solution (Production of Malignancy in vitro IV. Mouse Fibroblast Cultures and Changes Seen in Living Cells, W. R. Earle: J. National Cancer Institute 4:165, 1943), one part 5% lactalbumin hydrolysate, and one part inactivated serum, such as horse or bovine. After the porcine kidney cells show satisfactory growth, infective rhinotracheitis virus material is inoculated into the tissue culture fluid covering the kidney cells. Incubation at 35° C. for a suitable period of time results in a several-fold multiplication of the virus. Infectious bovine rhinotracheitis virus from different sources was inoculated into, and successfully propagated and modified in, porcine kidney cells including a suspension of respiratory tissue obtained from naturally infected cattle as well as I.B.R. virus propagated through different tissue culture systems, such as, bovine kidney tissue cultures. The strain of virus obtained from the infected turbinate, larynx, and tracheal tissue was passed at approximately four-day intervals through seven porcine kidney tissue culture passages. At that time the virus was titrated and found to contain $10^{5.8}$ TCID$_{50}$. This would give a theoretical dilution of the virus from the original tissue of $10^{-13.8}$. The virus titer of the original tissue suspension was $10^{3.2}$. This indicates that the virus had multiplied in the tissue culture to a total of $10^{10.6}$. Serial passage for 10 passages in porcine kidney tissue culture results in the modification of the virus to the extent that parenteral inoculation of susceptible calves will protect them against rhinotracheitis.

Using the virus from the 7th bovine kidney tissue culture passage, a series of passages were carried out in porcine kidney tissue culture at one- to four-day intervals for a sufficient number of passages to modify the virus to the extent that intramuscular inoculation into susceptible calves resulted in protecting them against rhinotracheitis without any symptoms of disease or an abnormal rise in temperature.

The results of this work can be better understood by some examples included in the following table:

EXAMPLES OF RESULTS OF INOCULATING CATTLE INTRAMUSCULARLY WITH I.B.R. VIRUS PROPAGATED SERIALLY IN PORCINE KIDNEY TISSUE CULTURE CELLS

| Passage Level | Passage Interval (Days) | Bovine No. | Results | |
|---|---|---|---|---|
| | | | Clinical | Immunity |
| 10 | 3–4 | B 186 | Normal | Yes |
| 60 | 1–2 | B 123 | Normal | Yes |
| | | B 131 | Normal | Yes |
| 60 | 3–4 | B 134 | Normal | Yes |
| | | B 135 | Normal | Yes |
| 100 | 1–2 | B 136 | Normal | Yes |
| | | B 137 | Normal | Yes |
| | | B 180 | Normal | Yes |
| | | B 181 | Normal | Yes |
| | | B 179 | Normal | Yes |
| 100 | 1–2 | B 182 | Normal | Yes |
| | | B 177 | Normal | Yes |
| | | B 172 | Normal | Yes |
| | | B 183 | Normal | Yes |
| | | B 184 | Normal | Yes |

For each calf listed in the table, a portion of the virus-laden tissue culture fluid was inoculated intramuscularly. The calves exhibited no signs of illness and developed immune bodies which were demonstrable by a neutralization test in bovine kidney tissue culture, as measured by a cytopathogenic effect. In addition, some of these animals were challenged two-three weeks later by inoculation with virulent disease-producing rhinotracheitis, no signs of illness developed, indicating that immunity to the virus had been produced by the initial inoculation of tissue culture virus.

The manner in which our invention is carried out is described in greater detail in conjunction with the following specific experiments. It is understood that the specific experiments are by way of illustration, and not by limitation.

*Propagation and modification of the virus*

Using roller tube porcine kidney cortex tissue culture, 0.2 ml. of tissue culture fluid containing virus from the 7th bovine kidney tissue culture passage was inoculated into each of several tubes. The virus that had been passed in the bovine kidney tissue culture for seven passages had been obtained from a naturally infected heifer showing clincial signs of bovine rhinotracheitis disease. The medium employed to maintain the growth of the tissue culture cells consists of eight parts of Earles balanced salt solution (sodium chloride 6.8 g., sodium phosphate monobasic 0.125 g., potassium chloride 0.40 g., calcium chloride 0.20 g., magnesium sulphate 0.20 gm., glucose 1.0 g., phenol red 0.02 gm., water to make 1000 ml.), one part of 5% lactalbumin hydrolysate, and one part inactivated horse serum. The nutrient fluid was adjusted to pH 7.6–7.8. Serial transfers were made inoculating 0.2 ml. of fluid from these tissue culture tubes into each of several new roller tube cultures. These transfers were made at one- to two-day intervals. Each transfer constituted approximately a tenfold dilution from the original virus-laden bovine kidney tissue culture fluid. Observation of the tubes under the microscope revealed a cytological change in the cells consisting of increased granulation, clumping of the cells together in grape-like masses, and eventual destruction and loss of the cells from the wall of the tube. This cytopathogenic effect on the cells due to the inoculum occurred on the first set of tubes prepared, and this effect occurred in all subsequently inoculated tissue culture tubes. Tissue culture fluid taken from tubes inoculated with material originating from the 60th serial passage, and containing an approximate virus concentration of $10^{6.2}$ per ml., was incolulated intramuscularly into two calves. No signs of illness or abnormal rise in temperature occurred. Immune bodies developed in these animals, and they showed no significant illness after a challenge inoculation of virulent disease-producing rhinotracheitis virus.

Another test of consecutive serial passages of this cytopathogenic virus in tissue culture tubes was conducted on material originating from the 100th passage. This tissue culture fluid contained $10^{6.5}$ $TCID_{50}$ in 1 ml. as indicated on titration in tissue culture. This material readily produced an immune response in the two calves as described above for the 60th passage, and without any signs of illness occurring. The fact that this material contained $10^{6.5}$ $TCID_{50}$ per 1.0 ml. of tissue culture fluid after dilution of the original inoculum at least to $10^{100}$ is definite proof that the virus has been propagated in the porcine tissue culture cells.

Another lot of virus originating from the 100 rapid passage was inoculated intramuscularly into eight calves in amounts varying from 1,000 to 1,000,000 $TCID_{50}$. No significant signs of illness occurred and all the animals even the two inoculated only with 1,000 $TCID_{50}$ developed neutralizing antibodies against I.B.R. virus.

This work illustrates that calves may be inoculated with 1,000,000 tissue culture infective doses ($TCID_{50}$) of virus obtained from either the 60th passage, or the 100th passage in porcine kidney tissue culture without showing signs of illness. These same animals developed immune bodies as demonstrated by a neutralization test, and showed no signs of disease when challenged with virulent rhinotracheitis virus. This is given as proof that the passages in porcine kidney tissue culture modified the virue, but retained the ability to immunize the cattle against subsequent exposure to rhinotracheitis disease.

In another example a suspension of respiratory tissues from cattle acutely ill with I.B.R. was inoculated in pig kidney tissue culture roller tubes and passed 10 times through such cultures. 10-passage material was then inoculated intramuscularly in 1 ml. amount containing $10^{6.0}$ $TCID_{50}$ of the virus into one calf. Again no significant illness could be observed in this animal and the calf developed neutralizing antibodies against I.B.R. virus.

The particular nutrient fluid which we have employed in the specific examples results in good growth of the desirable cells of the porcine kidney and is suitable for the growth of the rhinotracheitis virus. Other nutrient media suitable for propagating desirable cells of porcine kidney tissues may be employed: For example, eight parts of Earles-Sims solution, one par lactalbumin, one part inactivated horse serum; or medium No. 199 of Morgan and Parker with 5% to 10% inactivated horse serum (Morgan, J. F., et al., Proc. Soc. Exp. Biol. and Med., 1950, 73:1–8).

This invention provides a means of growing large quantities of virus outside of the bovine animal in concentrations much higher than those produced in the diseased animal. It also provides the propagation of the virus free of contaminating bacteria or other viruses that may be found in the live animal, or in bovine tissue cultures.

This invention provides a means of producing a virus that has been modified in such a manner that it is no longer capable of producing illness in cattle after inoculation. However, the virus is still capable of producing an immunity against infectious bovine rhinotracheitis disease.

The occurrence of the cytopathogenic effect (C.P.E.) in the tissue culture tubes following inoculation with this virus provides a means of accurately determining the concentration of the virus produced in the tissue culture fluids.

Identification of the virus

Several identification tests were performed on lots originated from the 10th, 60th, and 100th passage virus utilizing the neutralization of the C.P.E. in tissue culture. Serum neutralization tests were conducted with immune sera from cattle experimentally infected with I.B.R. virus propagated in bovine kidney tissue culture. As controls, either normal calf serum or plain tissue culture medium were employed. Equal quantities of undiluted serum or medium were mixed with concentrations of virus varying from 10 to 3,200 $TCID_{50}$. These mixtures were incubated at 35° C. for 2 hours and each mixture inoculated in 0.2 ml. amounts into each of several tubes. These were observed daily, with final reading approximately 5 to 7 days after the beginning of the test. It was found that control material, either normal calf serum or plain tissue culture medium, did not neutralize the C.P.E., although immune serum from animals inoculated with bovine kidney tissue culture-propagated virus neutralized the C.P.E. in roller tubes. Furthermore, animals inoculated intramuscularly with I.B.R. virus propagated in porcine kidney tissue culture developed antibodies which neutralized our standard I.B.R. neutralization test virus which was grown in bovine kidney tissue culture. Thus it was proved that the C.P.E. in porcine kidney cells was produced by a multiplication of the virus, and that the virus was the cause of the disease of rhinotracheitis in cattle.

Preparation of the vaccine

A series of roller tube porcine kidney tissue cultures, or flat-sided bottles containing the same cells prepared in the manner described above are seeded with porcine kidney tissue culture-propagated, modified rhinotracheitis virus. After an incubation for a suitable amount of time, the fluids are drawn off the cells, pooled, and either centrifuged at 1800 r.p.m. for ten minutes, or filtered to remove tissue debris. This constitutes a bulk raw vaccine. This raw vaccine may be diluted so that 10,000 to 100,000 $TCID_{50}$ are contained in 1 ml. of fluid. This dilution is made in either normal tissue culture fluid, sucrose glutamate solution, or other appropriate diluents. This raw vaccine may also be used undiluted. Quantities of this fluid virus are then dispensed into standard vaccine vials and dried by the usual freeze-drying procedure.

As was pointed out above, the only prior source of the virus of bovine rhinotracheitis was from tissues and secretions of naturally infected cattle, or virus propagated in bovine tissue cultures. The rhinotracheitis virus content of these materials might easily be contaminated with other disease-producing viruses or micro-organisms commonly found in bovine tissues. All reported attempts in the past to propagate this virus in embryonated eggs, rabbits and mice were unsuccessful.

However, by use of our special procedures employing serial passages in porcine kidney tissue culture, a modified virus can be readily cultivated in large quantities and in much higher concentrations than that of the virus found in natural bovine sources. This material can be produced by this method in such a manner that it is not contaminated with any other bovine viruses or bacteria, or other extraneous debris such as could occur if the material was obtained from cattle. This pure porcine tissue culture-propagated modified virus, when inoculated intramuscularly in cattle, immunizes them against infectious bovine rhinotracheitis disease without producing symptoms of the disease. The immune response following inoculation with porcine tissue culture-propagated virus can be demonstrated by serological methods showing specific antibodies against the disease, or by challenging the animals intranasally with disease-producing rhinotracheitis virus.

Using porcine tissue culture-propagated modified infectious rhinotracheitis virus in concentrations varying from 1,000 to 3,200,000 $TCID_{50}$ of virus, a number of susceptible calves were vaccinated with 1 ml. each of tissue culture vaccine prepared as described above. These animals developed a significant antibody response, or resisted a challenge intranasally with the disease-producing virus, as mentioned above.

It is seen that our invention is concerned with a process of modifying a virulent infectious bovine rhinotracheitis virus which comprises the step of introducing virulent infectious bovine rhinotracheitis virus into a nutrient fluid tissue culture medium which is non-toxic to said virus and which contains viable porcine kidney cells and permits their multiplication or sustaining, incubating said nutrient fluid tissue culture at a suitable temperature, preferably about 35° C., i.e., 33 to 38° C. and allowing the virus to grow therein for a period of at least about one day; thereafter removing virus particles from said nutrient fluid and introducing them into another such culture medium and continuing the serial passages of the infectious bovine rhinotracheitis virus from porcine kidney cell tissue cultures to porcine cell tissue cultures until at least 10 passages have been made and until the virus has lost its pathogenicity for bovines but is capable of producing protective antibodies against infectious bovine rhinotracheitis when injected intramuscularly in infectious bovine rhinotracheitis susceptible bovines.

Our invention is also concerned with the preparation of an infectious rhinotracheitis vaccine using the virus that has been modified by the method described in the preceding paragraph. It would be commercially impractical for the preparation of a vaccine to use as the starting material for each new batch of vaccine a virulent infectious bovine rhinotracheitis virus and go through sufficient serial passages in order to acquire the modified virus for use as a vaccine. Our invention, therefore, embodies the method of preparing an infectious rhinotracheitis virus vaccine which comprises using as the starting virus one that has already been modified by serial passage in porcine kidney tissue cultures as described above, or either a naturally occurring avirulent I.B.R. virus strain or I.B.R. virus modified by other means. Our vaccine is prepared by introducing an inoculum of the modified infectious bovine rhinotracheitis virus into a nutrient fluid tissue culture medium which is non-toxic to the virus and which contains viable propagated cells of porcine kidney, then incubating the said nutrient fluid tissue culture medium at a suitable temperature for a period of at least about one day and until the virus particles have multiplied sufficiently to give a high concentration thereof, and thereafter recovering virus particles from said tissue culture medium and preparing a vaccine therefrom.

We claim:

1. A process for attenuating infectious bovine rhinotracheitis virus which comprises serially passing live infectious bovine rhinotracheitis virus through several separate porcine kidney tissue cultures.

2. A process of attenuating infectious bovine rhinotracheitis virus for the production of a vaccine capable when injected into bovines of immunizing them against infectious bovine rhinotracheitis, which comprises introducing an inoculum of virulent infectious bovine rhinotracheitis virus into a nutrient fluid tissue culture medium which is non-toxic to said virus and which contains viable cells of porcine kidney, propagating said virus by incubating said nutrient fluid tissue culture medium at a temperature of about 35° for a period of at least about one day, thereafter separating an inoculum of said virus and serially passing the virus through other such porcine kidney tissue cultures for not less than about 10 passages.

3. A process of attenuating infectious bovine rhinotracheitis virus for the production of a vaccine capable when injected into bovines and immunizing them against infectious bovine rhinotracheitis, which comprises introducing an inoculum of virulent infectious bovine rhinotracheitis virus into a nutrient fluid culture medium of the group consisting of Earle's balanced salt solution plus minor quantities of lactalbumin hydrolysate and inactivated horse serum, medium No. 199, and medium No. 199 plus a minor quantity of horse serum, and which nutrient fluid contains viable cells of porcine kidney, propagating said virus by incubating said nutrient fluid culture at a temperature of about 35° for a period of at least about one day, thereafter separating an inoculum of said virus and serially passing the virus through other such porcine kidney tissue cultures for not less than about 10 passages.

4. A process of preparing an infectious bovine rhinotracheitis vaccine which comprises propagating an attenuated bovine rhinotracheitis virus produced by serially passing live infectious bovine rhinotracheitis virus through several separate porcine kidney tissue cultures and capable when injected into bovines of immunizing them against infectious bovine rhinotracheitis by introducing an inoculum of said attenuated virus into a nutrient fluid culture medium which is non-toxic to said virus and which contains viable cells of porcine kidney, incubating said tissue culture medium at a temperature of about 35° for a period of not less than one day and until said fluid medium contains at least 1 and up to about 10,000,000 tissue culture infectious doses of said attenuated virus per ml. and harvesting the fluid vaccine.

5. A process of preparing an infectious bovine rhinotracheitis vaccine which comprises propagating an attenuated bovine rhinotracheitis virus capable when injected into bovines of immunizing them against infectious bovine rhinotracheitis; which attenuation was produced by introducing an inoculum of virulent infectious bovine rhinotracheitis virus into a nutrient fluid culture medium which is non-toxic to said virus and which contains viable cells of porcine kidney, incubating said nutrient fluid at a temperature of about 35° for a period of not less than about one day, thereafter separating an inoculum of said virus and serially passing the virus through other such porcine kidney tissue cultures for not less than about 10 passages; by introducing an inoculum of said attenuated virus into a nutrient fluid culture medium which is non-toxic to said virus and which contains viable cells of porcine kidney, incubating said tissue culture medium at a temperature of about 35° for a period of not less than one day and until said fluid medium contains at least 1 and up to about 10,000,000 tissue culture infectious doses of said attenuated virus per ml. and harvesting the fluid vaccine.

6. A process of preparing an infectious bovine rhinotracheitis vaccine which comprises propagating an attenuated bovine rhinotracheitis virus capable when injected into bovines of immunizing them against infectious bovine rhinotracheitis; which attenuation was produced by introducing an inoculum of virulent infectious bovine rhinotracheitis virus into a nutrient fluid culture medium which is non-toxic to said virus and which contains viable cells of bovine kidney, incubating said nutrient fluid at a temperature of about 35° for a period of not less than about one day, thereafter separating an inoculum of said virus and serially passing the virus through other such bovine kidney tissue cultures for not less than about 40 passages; by introducing an inoculum of said attenuated virus into a nutrient fluid culture medium which is non-toxic to said virus and which contains viable cells of porcine kidney, incubating said tissue culture medium at a temperature of about 35° for a period of not less than one day and until said fluid medium contains at least 1 and up to about 10,000,000 tissue culture infectious doses of said attenuated virus per ml. and harvesting the fluid vaccine.

7. An infectious bovine rhinotracheitis vaccine, containing at least 1 and up to about 10,000,000 tissue culture infectious doses of virus per ml., capable of stimulating the production of protective infectious bovine rhinotracheitis antibodies, comparable to those produced by natural infections, when injected into non-immune bovines and without producing the usual pathological symptoms of infectious bovine rhinotracheitis, made by the process of claim 4.

8. An infectious bovine rhinotracheitis vaccine comprising a dry solid dosage unit form containing at least 1 and up to about 10,000,000 tissue culture infectious doses of a modified infectious bovine rhinotracheitis virus that has been propagated in porcine kidney tissue culture made by drying at a low temperature the fluid vaccine produced by the process of claim 4.

References Cited in the file of this patent

Bachrach: Science, vol. 122, No. 3183, December 30, 1955 pp. 1269–1270.

Madin: Science, vol. 124, October 19, 1956, pp. 721–722.